United States Patent [19]
Mohaupt

[11] 3,877,732
[45] Apr. 15, 1975

[54] HIGH PRESSURE ROTARY COUPLING

[75] Inventor: Udo H. Mohaupt, Galt, Ontario, Canada

[73] Assignee: The University of Waterloo, Waterloo, Ontario, Canada

[22] Filed: Sept. 28, 1972

[21] Appl. No.: 294,994

[52] U.S. Cl. .................. 285/94; 285/14; 285/334.2
[51] Int. Cl. .............................................. F16l 21/04
[58] Field of Search ............ 285/334.2, 94, 281, 13, 285/14; 308/106, 107, 114

[56] References Cited
UNITED STATES PATENTS

| | | | |
|---|---|---|---|
| 1,930,833 | 10/1933 | Barrett | 285/334.2 X |
| 1,969,531 | 8/1934 | Swedler et al. | 285/94 X |
| 2,679,411 | 5/1954 | Moore | 285/14 |
| 3,089,713 | 5/1963 | Scaramucci | 285/14 |
| 3,584,900 | 6/1971 | Lennon et al. | 285/14 |

Primary Examiner—Werner H. Schroeder
Assistant Examiner—Peter Nerbun
Attorney, Agent, or Firm—Sim & McBurney

[57] ABSTRACT

This invention relates generally to the field of high-pressure fluid transmission, and has to do particularly with apparatus which enables high-pressure fluid to be transmitted through rotatable joints, as required, for example, to enable high-pressure fluid jets to be manovered for machining or cutting.

13 Claims, 5 Drawing Figures

TORQUE REQUIRED TO INITIATE ROTATION

HIGH PRESSURE ROTARY COUPLING

GENERAL BACKGROUND OF THIS INVENTION:

In recent years, it has been found that fluids, particularly liquids, under pressures in the range of 100,000 psi can be utilized to form jets capable of cutting and machining a large number of materials. One of the problems that had to be overcome is that of moving the work piece with respect to a nozzle. One obvious solution to this problem that has been developed in the prior art is that of keeping the jet nozzle fixed, and shifting the work piece under the nozzle on a movable bed or carriage. This method is quite adequate for cutting or machining small work pieces, but for larger pieces a carriage of excessive size and expense would be required. Such a large carriage would have many inherent disadvantages related to its high inertia, particularly in the area of moving and controlling the carriage.

The other obvious solution to the problem of relative movement between the jet and the work piece is to provide a flexible piping system consisting of a combination of solid pipes and rotary couplings in an arrangement which permits the light weight nozzle to be moved instead of the carriage. In order to make this latter solution effective, the rotary couplings used must have a relatively low rotational friction, achieve effective sealing at very high pressures and be reasonably compact.

DISADVANTAGES OF THE PRIOR ART

In the design of every high-pressure rotary coupling, the designer cannot avoid the inclusion of a seal which exerts some frictional resistance to the rotation of the coupling, and across which all or part of the pressure gradient exists. In other words, there must be some seal having the high-pressure fluid on one side and atmospheric pressure (or other low-pressure environment) on the other, and when one is dealing with pressures in the range of 100,000 psi, the problems of preventing leakage and preserving the integrity of the sealing surface against erosion by the high-pressure fluid become enormous.

A further problem confronted by designers of high-pressure swivel couplings relates to the fact that if the high-pressure fluid is allowed to bear against any portion of the coupling that has a large projected area in the axial direction, tremendous axial thrust forces can be developed, which have to be opposed mechanically.

Exemplary of this kind of problem in the prior art is U.S. Pat. No. 1,930,833, entitled "Swiveling Hose Union", issued Oct. 17, 1933 to J. H. Barrett.

Essentially, Barrett's swivel hose connection is one that would be incapable of withstanding pressures in the range of 100,000 psi because his parts are arranged in such a way that the full line pressure would be applied over a relatively large surface area projected in the axial direction, and this pressure would be exerted on a face-to-face annular sealing surface. The axial force urging the faces of the sealing surface together would simply create far too high a frictional resistance to rotation to permit any rotation to take place.

Barrett is also exemplary of the prior art in his provision of a swivel coupling which fully contains the pressurized fluid, and permits no leakage whatever out of the coupling as a whole. Despite the fact that Barrett provides for leakage across an internal bearing surface, that leakage continues only until the pressures inside and outside that internal bearing surface become equalized, at which point the internal bearing surface might just as well be discarded because it serves merely to increase rotational friction. When the equalization of pressures takes place, the entire pressure drop occurs across another "outer" seal, which is the one against which the tremendous axial thrust forces are exerted.

OBJECTS OF THIS INVENTION

It is among the objects of this invention to provide a high-pressure swivel coupling in which the high pressure fluid contained within the coupling is utilized in a controlled leakage situation to lubricate the bearing surfaces and thus minimize rotational friction.

It is also among the objects of this invention to provide a high-pressure swivel coupling in which axial thrust forces are minimized, thereby further reducing rotational friction.

GENERAL DESCRIPTION OF THIS INVENTION

Generally, the above objects are attained by relinquishing the notion of totally sealing the coupling against leakage, and by purposely using and controlling fluid leakage in such a way as to lubricate the sealing surfaces which rotate with respect to each other.

PARTICULAR DESCRIPTION OF THE INVENTION

Accordingly, this invention provides a high-pressure swivel coupling, comprising: a first body member, a second body member mounted for rotation with respect to the first body member about an axis of rotation, means for restraining axial movement of the second body member with respect to the first body member, a first seating recess in said first body member symmetrical about said axis, a first passageway communicating with said first seating recess, a second seating recess in said second body member symmetrical about said axis, a second passsageway communicating with said second seating recess, a sealing member having a passage joining a first opening with a second opening, the sealing member defining around said first opening a first portion complementary to said first seating recess, and defining around said second opening a second portion complementary to said second seating recess, and vent means for removing fluid escaping across the seating recesses, whereby most of the gauge pressure differential between the interior of said passageways and the atmosphere occurs across said seating recesses, and whereby the said escaping fluid lubricates said seating recesses.

Adjustment means are provided for adjusting the axial position of the second body member with respect to the first body member, thereby to control the pressure between the portion and the seating recesses, and thus to control the rate at which fluid escapes across the seating recesses.

GENERAL DESCRIPTION OF THE DRAWINGS

Two embodiments of this invention are shown in the accompanying drawings, in which like numerals denote like parts throughout the several views, and in which FIG. 1 is an axial sectional view through a high-pressure swivel coupling utilizing the first embodiment of this invention;

PARTICULAR DESCRIPTION OF THE DRAWINGS

Figure 1:
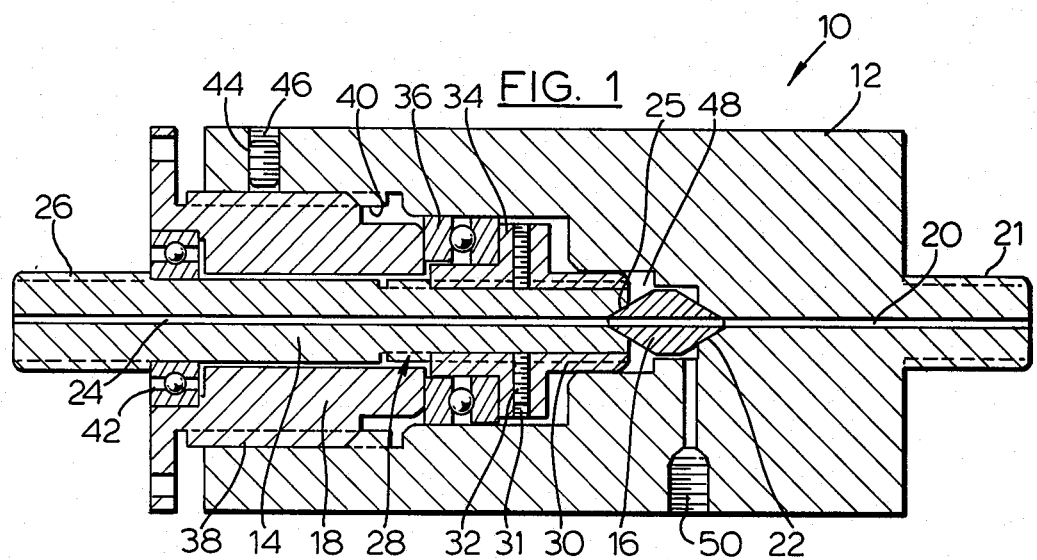

Attention is first directed to FIG. 1, in which a high-pressure swivel coupling shown generally at 10 consists of a first body member 12, a second body member 14, a sealing member 16, and a retaining screw member 18.

Figure 2:
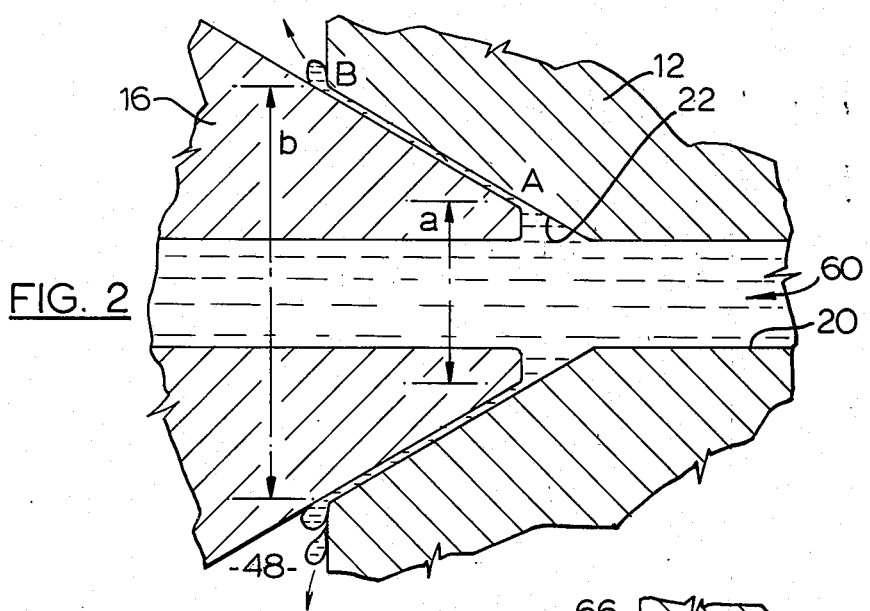
FIG. 2 is an axial sectional view, to a larger scale, of a portion of the swivel coupling of FIG. 1.

The first body member 12 has a first passageway 20 which opens rightwardly through a threaded extension 21 and which opens leftwardly into a first conical seating recess 22, which is seen more clearly in FIG. 2.

The first body member 12 may be in the form of a cylinder coaxial with the first passageway 20, although it will be appreciated from what follows that this particular shape for the first body member 12 is not essential.

The second body member 14 is, in the embodiment shown, an elongated cylinder having a central bore constituting a second passageway 24 which opens rightwardly into a second conical seating recess 25. The cylindrical second body member 14 is threaded at its leftward end as seen at 26, and is threaded at its rightward end as seen at 28. The threaded leftward end of the second body member 14 is intended to be engaged with further appropriate components either receiving or delivering high-pressure fluid from or to the second passageway 24, but which do not form a part of this invention. The same function is served by the threaded extension 21 of the first body member 12.

It will be seen in FIG. 1 that the threaded righthand end of the second body member 14 engages an internally threaded collar 30 which has lateral threaded bores 31 in which are threaded set screws 32.

The collar 30 includes a laterally extending flange 34 which bears against an axial thrust bearing 36, which in turn bears against the rightward end of the retaining screw member 18. It will be realized that the axial thrust bearing 36 is designed and arranged to permit axial rotation of the second body member 14 with respect to the first body member 12, while restraining movement of the one body member with respect to the other in the axial direction.

The retaining screw member 18 has external threads 38 which engage internal threads 40 of the first body member 12 whereby axial adjustment of the retaining screw member 18 with respect to the first body member 12 is permitted. The axial adjustability of the retaining screw member 18 with respect to the first body member 12 also permits axial adjustment of the second body member 14 with respect to the first body member 12.

FIG. 1 also shows an alignment bearing 42 to ensure that the second body member 14 and the retaining screw member 18 remain axially aligned.

A further set screw 44 in a suitable, internally threaded, lateral bore 46 permits the retaining screw member 18, and thus the second body member 14, to be locked in a given axial position with respect to the first body member 12.

It will be noted that the sealing member 16 is located within a cavity 48 inside the first body member 12, and that a vent passage 50 communicates the cavity 48 with the exterior of the first body member 12.

Figure 3:
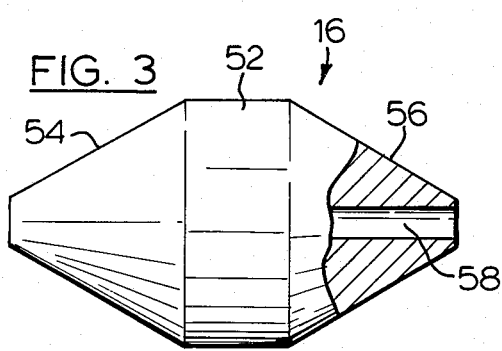
FIG. 3 is a partly-sectional, partly-elevational view of a sealing member employed in the first embodiment of this invention.

Attention is now more closely directed to the sealing member 16, which is shown to a larger scale in FIG. 3. The sealing member 16 has a central cylindrical portion 52, a leftward conically convergent portion 54, and a rightward conically convergent portion 56. The convergent portions 54 and 56 are not complete cones, however, as their apices are missing. The portions 54 and 56 are thus conical frustums.

Extending axially through the sealing member 16 is a central passage 58 which opens rightwardly through the end of the convergent portion 56 and leftwardly through the end of the convergent portion 54. The central passage 58 is thus an open-ended passageway.

Attention is once more directed to FIG. 1, in which it will be seen that the sealing member 16 has its convergent portions 54 and 56 engaged with the seating recesses 25 and 22, respectively.

The cone angles of the convergent portions 54 and 56 of the sealing member 16, as measured between a conical meridian and the conical axis, are approximately 30° in this particular embodiment, although it will be appreciated that this particular cone angle is not critical. A more thorough discussion of the significance of the cone angle will be undertaken below.

Whatever the cone angle of the convergent portions 52 and 54, the seating recesses 22 and 25 must have the same cone angle, so that a surface-to-surface contact is realized. Thus, a convergent portion and its respective seating recess must be complementary to each other.

When the swivel coupling has been assembled as shown in FIG. 1, with the sealing member 16 tightly clamped between the two seating recesses 22 and 25, the interior of the passageways 20 and 24 and the passage 58 can be filled with the high-pressure fluid. The retaining screw member 18 can then be adjusted to achieve and maintain a controlled leakage or escape of the high-pressure fluid across the interfaces between the sealing member 16 and the two seating recesses 22 and 25.

Attention is directed to FIG. 2, which shows to a much greater scale the slight separation between the sealing member 16 and the seating recess 22 under the urging of the high-pressure fluid. As seen, the fluid passes between the sealing member 16 and the seating recess 22 into the cavity 48, and in so doing provides a lubricated bed between the sealing member 16 and the first body member 12 which has the effect of minimizing frictional resistance to rotation between the two members. Naturally, an adjustment of the axial position of the sealing member 16 with respect to the first body member 12 by adjusting the retaining screw member 18 will permit control of the rate of leakage of the fluid 60.

The fact that the vent passage 50 remains always in communication with the exterior of the first body member 12 ensures that the cavity 48 will remain at atmospheric pressure, and this in turn means that the entire pressure differential or pressure gradient between the high-pressure fluid and the atmosphere will exist across the seating recesses 22 and 25. Looking at FIG. 2, it is probable that the pressure within the space between the sealing member 16 and the seating recess 22 will diminish in a continuous manner from the maximum line pressure at the location A to atmospheric pressure at the location B.

If we now utilize the foregoing assumptions in an attempt to calculate the extent of the axial force that must be exerted between the first and second body members 12 and 14 to limit the escape of fluid past the seating recesses 22 and 25 to a controlled leak, and thus to calculate the compressive force on the axial thrust bearing 36, it will be clear that the axial thrust will have two basic contributing factors, as follows (a) The product of line pressure times the circular area of diameter $a$ (see FIG. 2), and (b) the sum of the products of the axially projected annular increments of area from $a$ to $b$ times the corresponding incremental pressures from $a$ to $b$. Obviously, if the variation of the pressure along the seating recess from $a$ to $b$ were exactly known, it would be a simple matter to calculate the component of axial thrust attributable to the flowing fluid moving past the seating recess and diminishing in pressure from $a$ to $b$. Clearly, the total axial force cannot be greater than the product of the internal fluid pressure times a circular area of diameter $b$, because this would assume that the internal fluid pressure remains at its maximum across the entire area of the seating recess, which cannot be so.

It will now be appreciated that the axial thrust on the bearing 36 is in some manner a function of the diameter $b$, which is the maximum diameter of the frusto-conical seating recess 22 in FIG. 2. Clearly, if this maximum diameter b were made smaller, without changing the size of the sealing member 16 or the diameter of the passageway 20, the compressive force on the axial thrust bearing 36 would decrease. However, this would also mean that the distance from A to B along a meridian of the frusto-conical seating recess 22 would diminish as well, which would require that the entire pressure differential between the maximum internal fluid pressure and the atmosphere would occur across a smaller distance. This in turn could increase the leakage rate for a given perpendicular spacing between the seating recess and the mating surface of the sealing member 16, which in turn could give rise to erosion problems as a result of the tendency for the very high-pressure fluid to scour and eat away at the mating surfaces, particularly if any flaws of even microscopic size should be present in these surfaces.

The foregoing considerations lead to the general relationship that can be stated as follows: The shorter the finite distance along the seating interface over which the total pressure drop takes place, the more accurate or highly polished the surfaces must be to prevent scouring and erosion.

It will thus be seen that the design of a swivel coupling in accordance with this application involves a tradeoff between axial thrust and accuracy of the mating surfaces.

Figure 4:
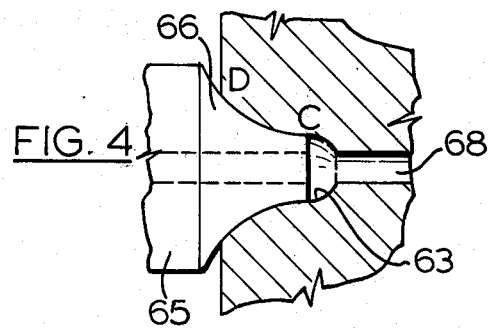
FIG. 4 is a partly broken-away axial sectional view of a sealing element of the second embodiment of this invention.

One possible way in which axial thrust might be decreased while maintaining or increasing the distance over which the pressure differential takes place is to alter the configuration of the mating surfaces so that the area in which the pressure is highest has a relatively smaller axially projected area. The second embodiment of this invention, shown in FIG. 4, represents one of many possible configurations which could achieve this end, depending upon the actual profile of the pressure drop. It will be seen in FIG. 4 that the seating recess 63 is no longer conical, but is bell-shaped or campanular, such that it flares outwardly to the left. The sealing member 65 has a complementally shaped portion 66 which achieves surface-to-surface contact with the seating recess 63.

In FIG. 4, the pressure differential will exist across the seating recess 63 with the maximum at the location C and the minimum (atmospheric) at the location D. It will be observed that the location at which the pressure is highest, that extending leftwardly adjacent to the location C, generally defines a very small acute angle with the axis of the passageway 68, and thus the axial projection of this area of high pressure will be smaller than the equivalent area in the FIG. 2 embodiment. The area of the surface-to-surface interface adjacent to the location D, where the seating recess flares outwardly, does have a comparatively larger axially projected area, but the pressure in this area is smaller, and therefore tends to contribute less to the total axial thrust.

It will also be understood that a similar effect, that of decreasing the maximum axial thrust while retaining the distance over which the pressure differential exists, can be achieved by retaining the conical seating recesses of the first embodiment, but making the cone angle smaller. It is for this reason that this invention is not considered to be limited to any particular cone angle, or even to a narrow range of cone angles. Nor does the invention require that the mating surfaces necessarily be conical, although the conical profile is among the easier profiles to machine and polish.

It will be understood that a seating recess and complementary portions of the sealing member could also have an axial profile with the opposite curvature to that shown in FIG. 4, i.e. one in which the high pressure area of the interface defines a larger angle to the passageway axis than that defined by the low-pressure area of the interface.

Generally, ball bearings have lower friction coefficients that plain-surface bearings, and because of this, it will be understood that as the pressure in the swivel coupling (after tightly clamping the sealing member 16 in place) is increased from atmospheric pressure to the operating pressure, and the controlled leak is initiated, the friction moment will be transferred from the mating surfaces in the seating recesses to the axial thrust bearing 36, thereby causing the total friction moment in the swivel coupling to decrease to its minimum value at the operating pressure.

Figure 5:
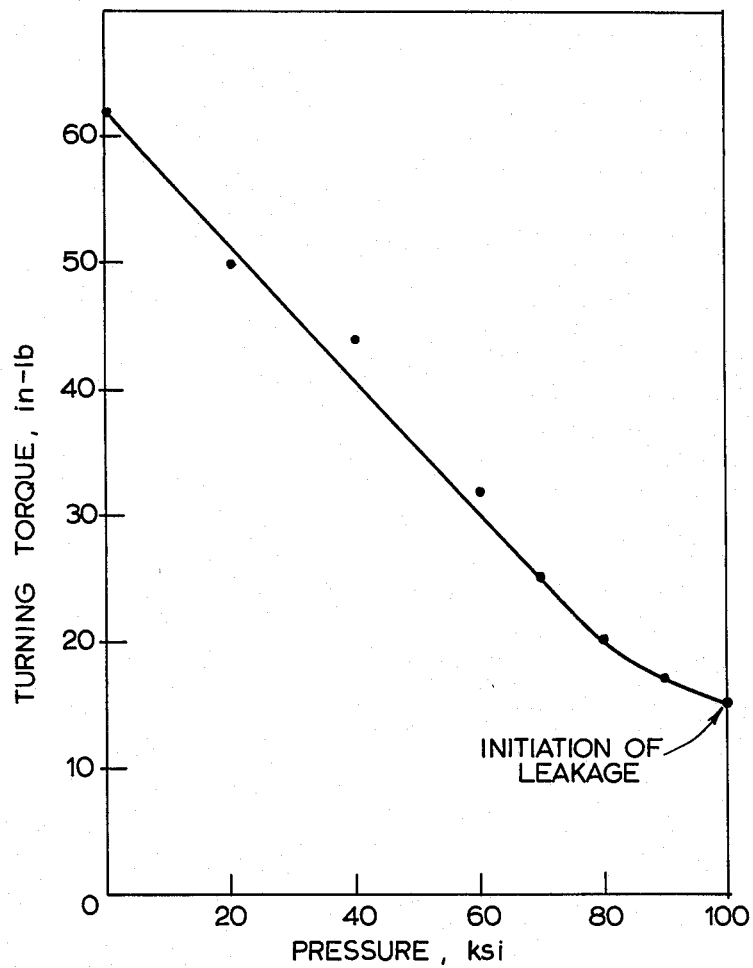
FIG. 5 is a graph illustrating the pressure-torque relationship resulting from tests of the first embodiment of this invention.

This relationship is shown in FIG. 5, in which the torque necessary to initiate rotation of the first body member 12 with respect to the second body member 14 is plotted against the line pressure in ksi.

The points shown on the graph of FIG. 5 were derived from actual tests on a prototype built in accordance with the design of FIG. 1. The first body member 12 was held stationary with the central axis horizontal, and a lever was attached to the second body member 14 extending horizontally with slidable weights on it. The weights were moved along the lever incrementally until rotation of the second body member with respect to the first body member 12 was observed. The torque was then calculated on the basis of the size of the weights and their distances from the central axis.

This process was repeated at a number of different line pressures, and the points shown in FIG. 5 were then plotted.

It will be noted that, as the line pressure increases, the rotation-initiating torque decreases, and tends to level off when the maximum operating pressure of 100,000 psi is reached. It was at this maximum operating pressure that the initiation of leakage across the seating recesses 22 and 25 was observed. Because at this point the sealing member 16 was essentially "floated" between the first and second body members 12 and 14, the rotary friction could not be decreased any further, because total lubrication of those surfaces was taking place. The rotary friction was then substantially the same as the rotary friction in the axial thrust bearing 36 at the given axial load, and that rotary friction is an inherent characteristic of the thrust bearing itself.

To arrive at the experimental points plotted on FIG. 5, a mixture of water and soluble oil were used as the operating fluid.

Subsequent tests with other fluids such as ethylene glycol or univis P38 oil resulted in substantially the same graphical relation as is plotted in FIG. 5.

Slight differences in the leakage rate were observed but not measured. In general, a leakage rate of 25 in.$^3$ per hour might be expected, but could be decreased by tightening the retaining screw member 18.

It will be appreciated, of course, that even though the axial sectional view of FIG. 2 is considerably enlarged from the view of FIG. 1, the perpendicular separation between the mating surfaces is still greatly exaggerated for purposes of illustration. At operating pressures in the range of 100,000 psi, the actual separation between the mating surfaces would not be apparent in a view magnified to the extent of FIG. 2.

It will also be understood that the essence of this invention is inherent in a single surface-on-surface seating recess, and need not necessarily involve two opposed recesses. Thus, it is clear that the advantages of this invention would be exhibited if, for example, the second body member 14 had a rightwardly projecting converging cone adapted to register complementally with the seating recess 22 in the first body member 12. In this manner, the sealing member 16 could be dispensed with. It will be realized, however, that provision of the sealing member 16 reduces somewhat the alignment requirements for the body members 12 and 14.

It will further be clear that the vent 50 can be in communication either with the ambience (atmospheric pressure) or with a possibly sealed environment at a pressure less than the line pressure. All that is essential is that most of the gauge pressure differential between the interior of the passageways and the atmosphere occur across the seating recess(es), so that fluid flow across the seating recess(es) will take place.

What is claimed is:

1. A swivel coupling for high pressure fluid, comprising:
    a first body member,
    a second body member mounted for rotation with respect to the first body member about an axis of rotation,
    means for restraining axial movement of the second body member with respect to the first body member,
    a first seating recess in said first body member symmetrical about said axis,
    a first passageway communicating with said first seating recess,
    a second seating recess in said second body member symmetrical about said axis,
    a second passageway communicating with said second seating recess,
    a solid sealing member having a passage joining a first opening with a second opening, the sealing member defining around said first opening a first portion complementary and parallel to said first seating recess, and defining around said second opening a second portion complementary and parallel to said second seating recess, the sealing member being mounted between said first and second seating recesses under a gripping pressure which is such as to permit a controlled and continuous escape of said fluid across both said seating recesses, and means for continuously removing fluid escaping across the seating recesses, said means for removing fluid being located in said first body member and extending to the exterior thereof along a line that is not parallel to the length of said passageways whereby the pressure drop between the interior of said passageways and the exterior occurs across said seating recesses to minimize the axial separative thrust between each recess and the respective complementary portion of the sealing member, and to permit the said escaping fluid to lubricate said seating recesses.

2. The invention claimed in claim 1, in which the first seating recess converges away from said second body member, and in which the second seating recess converges away from said first body member.

3. The invention claimed in claim 1, in which the first and second seating recesses are both conical, each seating recess converging away from the other.

4. The invention claimed in claim 1, in which said means for restraining axial movement includes an axial thrust bearing, and in which both seating recesses are conical and converge away from each other.

5. The invention claimed in claim 4, in which the said passage is cylindrical, and in which the sealing member is radially symmetrical about said passage, said first and second portions being frusto-conical and converging away from each other, the openings being located at the apex ends of the conical portions.

6. The invention claimed in claim 5, in which the cone angle of said portions is between 15° and 45° to the axis of symmetry.

7. The invention claimed in claim 5, in which the cone angle of said portions is substantially 30° to the axis of symmetry.

8. The invention claimed in claim 1 which further includes adjustment means for adjusting the axial position of said second body member with respect to said first body member, thereby to control the rate at which fluid escapes across the seating recesses.

9. The invention claimed in claim 8, in which the first and second seating recesses converge away from each other.

10. The invention claimed in claim 9, in which the second body member is an elongated cylinder having a central bore constituting said second passageway, the swivel coupling further comprising a retaining screw member having a central opening for receiving the elongated cylinder, said second seating recess being in one end of said elongated cylinder, said means for restraining axial movement including an axial thrust bearing between the retaining screw member and the elongated cylinder, said thrust bearing resisting axial movement of the elongated cylinder in the direction in which said second seating recess converges, the retaining screw member being axially adjustable with respect to the first body member by virtue of threaded engagement therewith.

11. The invention claimed in claim 1, in which the first and second seating recesses are both companular, each seating recess converging away from the other.

12. A method of minimizing rotational friction in a high-pressure swivel coupling between a first body member having a first passageway and a second body member having a second passageway, said method comprising the steps:

providing a solid sealing member having a passage joining a first opening with a second opening, the sealing member defining around the openings portions which converge away from each other and are radially symmetrical about a common axis, providing seating recesses in the body members complementary and parallel to the said portions and communicating with the respective passageways, mounting one body member for rotation with respect to the other body member such that the seating recesses are aligned and open toward each other, engaging the sealing member in the seating recesses and adjusting the axial position of one body member with respect to the other to tighten that engagement, placing a high-pressure fluid in said passage and passageways, again adjusting the axial position of one body member with respect to the other to achieve a controlled and continuous escape of said fluid across said seating recesses to the exterior of the first body member by way of a path extending through said first body member and along a line that is not parallel to the length of said passageways to cause the pressure drop between the interior of said passageways and said exterior to occur across the seating recesses to minimize the axial separative thrust between each recess and the respective complementary portions of the sealing member, and to lubricate the recesses and minimize rotational friction.

13. In a swivel coupling for high-pressure fluid, a lubricated joint between a solid first member and a solid second member, comprising:

a recess in the first member which converges away from the second member, is radially symmetrical, and communicates with a first passageway in the first member, means mounting the second member for rotation about the axis of symmetry of said recess, a portion of said second member being complementary and parallel with said recess, symmetrical about said axis, and in surface-to-surface engagement with said recess, a second passageway in said second member communicating with said first passageway, means for adjusting the axial position of said second member with respect to said first member, and for restraining mutual axial movement once said axial position is adjusted, in order to permit a continuous and controlled escape of said fluid across said recess to lubricate the recess and to cause the pressure drop between said passageways and said location to occur across the recess to minimize the axial separative thrust between said members and means for continuously removing fluid escaping across the seating recesses, said means for removing fluid being located in said first body member and extending to the exterior thereof along a line that is not parallel to the length of said passageways.

* * * * *